US008841369B2

(12) United States Patent
Meyer et al.

(10) Patent No.: US 8,841,369 B2
(45) Date of Patent: Sep. 23, 2014

(54) LATENTLY REACTIVE POLYURETHANE DISPERSION WITH ACTIVATABLE CROSSLINKING

(75) Inventors: Axel Meyer, Heidelberg (DE); Maria Teresa Hechavarria Fonseca, Mannheim (DE); Tina Schroeder-Grimonpont, Rheinzabern (DE); Stefan Dahmen, Freinsheim (DE); Christian Beil, Worms (DE); Karl-Heinz Schumacher, Neustadt (DE); Thomas Abend, Locarno-Monti (CH)

(73) Assignee: BASF SE, Ludwigshafen (DE)

( * ) Notice: Subject to any disclaimer, the term of this patent is extended or adjusted under 35 U.S.C. 154(b) by 103 days.

(21) Appl. No.: 13/436,050

(22) Filed: Mar. 30, 2012

(65) Prior Publication Data
US 2012/0252926 A1 Oct. 4, 2012

Related U.S. Application Data

(60) Provisional application No. 61/469,098, filed on Mar. 30, 2011.

(51) Int. Cl.
| C08K 5/17 | (2006.01) |
| C08K 5/23 | (2006.01) |
| C08G 18/10 | (2006.01) |
| C08G 18/08 | (2006.01) |
| C08G 18/79 | (2006.01) |
| C08G 18/12 | (2006.01) |
| C08G 18/66 | (2006.01) |
| C08G 18/72 | (2006.01) |
| C09D 175/04 | (2006.01) |
| C09J 175/04 | (2006.01) |
| B29C 65/48 | (2006.01) |

(52) U.S. Cl.
CPC ............ *C08G 18/6692* (2013.01); *C08G 18/10* (2013.01); *C08G 18/0828* (2013.01); *C08G 18/798* (2013.01); *C08G 18/12* (2013.01); *C08G 18/0823* (2013.01); *B29C 65/4845* (2013.01); *C08G 18/725* (2013.01); *B29C 65/48* (2013.01); *C09D 175/04* (2013.01); *C09J 175/04* (2013.01); *B29C 65/4815* (2013.01)

USPC ........... 524/190; 524/251; 524/252; 524/254; 524/521

(58) Field of Classification Search
USPC .......................... 524/251, 591, 190, 252, 254
See application file for complete search history.

(56) References Cited

U.S. PATENT DOCUMENTS

| 3,412,054 A | 11/1968 | Milligan et al. |
| 3,905,929 A | 9/1975 | Noll |
| 3,920,598 A | 11/1975 | Reiff et al. |
| 4,192,937 A | 3/1980 | Noll et al. |
| 4,269,748 A | 5/1981 | Nachtkamp et al. |
| 4,292,226 A | 9/1981 | Wenzel et al. |
| 4,663,415 A | 5/1987 | Grögler et al. |
| 5,814,689 A * | 9/1998 | Goldstein et al. ............... 524/86 |
| 6,518,388 B1 | 2/2003 | Fenn |
| 2009/0104453 A1* | 4/2009 | Burghardt et al. ......... 428/423.3 |

FOREIGN PATENT DOCUMENTS

| CA | 1 129 128 | 8/1982 |
| DE | 1495745 | 9/1963 |
| DE | 1 954 090 | 5/1971 |
| DE | 2 034 479 | 1/1972 |
| DE | 2 221 170 | 11/1973 |
| DE | 39 11 827 A1 | 10/1990 |
| DE | 0 622 378 A1 | 11/1994 |
| EP | 0 171 015 A2 | 2/1986 |
| EP | 0 171 015 B1 | 3/1991 |
| WO | WO 97/18257 | 5/1997 |
| WO | WO 00/39186 A1 | 7/2000 |

OTHER PUBLICATIONS

International Search Report and Written Opinion issued Nov. 20, 2012, in PCT/EP2012/055066, filed Mar. 22, 2012 with English translation of category of cited documents.

* cited by examiner

*Primary Examiner* — Kriellion Sanders
(74) *Attorney, Agent, or Firm* — Oblon, Spivak, McClelland, Maier & Neustadt, L.L.P.

(57) ABSTRACT

A description is given of an aqueous polymer dispersion comprising at least one polyurethane, dispersed in aqueous phase and having one or more uretdione groups, and at least one solid polyamine with a deactivated surface, said dispersion being useful as an adhesive, coating material or sealant or for producing adhesive, coating or sealing compositions. The compositions can be activated thermally or by electromagnetic radiation.

20 Claims, No Drawings

LATENTLY REACTIVE POLYURETHANE DISPERSION WITH ACTIVATABLE CROSSLINKING

The invention relates to an aqueous polymer dispersion comprising at least one polyurethane, dispersed in aqueous phase and having one or more uretdione groups, and at least one solid polyamine with a deactivated surface. The polymer dispersion can be used as an adhesive, coating material or sealant or for producing adhesive, coating or sealing compositions.

Aqueous polymer dispersions based on polyurethanes are used for a variety of applications, for example, as an adhesive, coating material or sealant, or for producing adhesive, coating or sealing compositions. The polyurethanes used in these applications are linear to start with, but for the purpose of improving their performance properties they may be crosslinked or branched with a suitable crosslinking system.

WO97/18257 describes aqueous polyurethane dispersions, the polyurethanes having uretdione groups. The uretdione groups are incorporated into the polymer chain using polyisocyanate dimers. Through reaction with suitable reactive polyamine compounds such as, for example, primary or secondary diamines, hydrazines or polyhydrazides, a crosslinking reaction can take place.

The addition of the polyamine compounds described in WO97/18257 to uretdione-containing polyurethane dispersions results, as a consequence of premature crosslinking and of pH alteration, to a sharp increase in the viscosity of the polyurethane dispersions and hence to a limited application time. The increase in viscosity that occurs can lead to complications for the subsequent coating of substrates. An excessive viscosity adversely affects the applicability of the compositions. Systems of this kind therefore cannot be employed as one-component, readily activatable systems having good storage qualities.

The object of the present invention was to develop a latently reactive polyurethane dispersion with activatable crosslinking that is suitable for coating, adhesive or sealing applications. In this context, the pot life, i.e., the time window available for good processing properties, ought to be prolonged for as long as possible; it ought to be possible to produce one-component systems with a very long storage life; it ought to be possible to produce activatable, pre-coated films and other substrates; it ought to be possible to bring about more flexible design of coating processes; and/or it ought to be possible to use aqueous dispersions having higher solids contents and, in association therewith, shortened drying times.

The invention provides an aqueous polymer dispersion, comprising
a) at least one polyurethane in dispersion in aqueous phase and having one or more uretdione groups, and
b) at least one solid polyamine with a deactivated surface.

The polyurethane dispersions of the invention that are described below can be used as a primary dispersion for producing formulations, such as coating materials, sealants or adhesives. Advantageously, they can usually also be converted into a solid form, such as a powder, for example, which can easily be redispersed to form a secondary dispersion and thus incorporated into a formulation, such as a coating material, a sealant or an adhesive.

The polyurethane dispersions of the invention comprise at least one polyurethane. Suitable polyurethanes are obtainable in principle through reaction of at least one polyisocyanate with at least one compound which has at least two groups reactive toward isocyanate groups. Polyurethanes of the invention also encompass what are called polyurethane-polyureas, which as well as polyurethane groups also have urea groups as well. Suitable polyurethane-polyureas are, for example, those with uretdione groups distributed statistically in their molecular assembly, as are described in DE 2221170, for example.

The polyurethane dispersion of the invention preferably comprises at least one polyurethane which comprises in copolymerized form at least one polyisocyanate and at least one polymeric polyol. The polyurethane may more particularly be formed from at least one polyisocyanate, at least one polyisocyanate uretdione, and at least one polymeric polyol. Suitable polymeric polyols are preferably selected from polyester diols, polyether diols, and mixtures thereof. The polymeric polyol preferably has a number-average molecular weight in the range from about 500 to 5000 g/mol. Polymeric diols are preferred. The polyurethane dispersion of the invention preferably comprises at least one polyurethane which comprises in copolymerized form at least one polyisocyanate and a diol component, of which a)
10-100 mol %, based on the total amount of the diols, have a molecular weight of 500 to 5000 g/mol and b) 0-90 mol %, based on the total amount of the diols, have a molecular weight of 60 to 500 g/mol.

The polyurethane is preferably synthesized to an extent of at least 40% by weight, more preferably at least 60% by weight, and very preferably at least 80% by weight, based on the total weight of the monomers used in preparing the polyurethane, of at least one diisocyanate and at least one polyether diol and/or polyester diol. Suitable further synthesis components to 100% by weight are, for example, the below-specified polyisocyanates having at least three NCO groups, and compounds that are different from the polymeric polyols and have at least two groups reactive toward isocyanate groups. These include, for example, diols; diamines; polymers different from polymeric polyols and having at least two active hydrogen atoms per molecule; compounds which have two active hydrogen atoms and at least one ionogenic or ionic group per molecule; and mixtures thereof.

The polyurethane preferably has a softening point or melting point in the range from −50 to 150° C., more preferably from 0 to 100° C., and very preferably from 10 to 90° C. With particular preference the polyurethane has a melting point in the above temperature range.

Preferred polyurethanes are synthesized from:
a) at least one monomeric diisocyanate,
b) at least one diol, component (b) comprising at least one diol having a number-average molecular weight in the range from 500 to 5000 g/mol,
c) at least one monomer, different from the monomers (a) and (b), having at least one isocyanate group or at least one group reactive toward isocyanate groups, and additionally carrying at least one hydrophilic group or potentially hydrophilic group,
d) at least one polyisocyanate uretdione, preferably at least one diisocyanate uretdione,
e) optionally at least one further compound, different from the monomers (a) to (d), having at least two reactive groups selected from alcoholic hydroxyl groups, primary or secondary amino groups or isocyanate groups, and
f) optionally at least one monofunctional compound, different from the monomers (a) to (e), having a reactive group which is an alcoholic hydroxyl group, a primary or secondary amino group or an isocyanate group.

Component b) is composed preferably of b$_1$) 10 to 100 mol %, based on the total amount of component b), of diols having a molecular weight from 500 to 5000 g/mol, b$_2$) 0 to 90 mol %, based on the total amount of component b), of diols having a molecular weight of 60 to less than 500 g/mol.

The ratio of the diols b$_1$) to the monomers b$_2$) is more preferably 0.1:1 to 5:1, more preferably 0.2:1 to 2:1. More particularly the diol b) is selected from polytetrahydrofuran, polypropylene oxide and polyester diols selected from reaction products of dihydric alcohols with dibasic carboxylic acids, and lactone-based polyester diols.

Particular mention may be made as monomers (a) of diisocyanates X(NCO)$_2$, where X is an aliphatic hydrocarbon radical having 4 to 15 carbon atoms, a cycloaliphatic or aromatic hydrocarbon radical having 6 to 15 carbon atoms, or an araliphatic hydrocarbon radical having 7 to 15 carbon atoms. Examples of such diisocyanates include tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane (IPDI), 2,2-bis(4-isocyanatocyclohexyl)-propane, trimethylhexane diisocyanate, 1,4-diisocyanatobenzene, 2,4-diisocyanatotoluene, 2,6-diisocyanatotoluene, 4,4'-diisocyanato-diphenylmethane, 2,4'-diisocyanatodiphenylmethane, p-xylylene diisocyanate, tetramethylxylylene diisocyanate (TMXDI), the isomers of bis(4-isocyanatocyclohexyl)methane (HMDI) such as the trans/trans, the cis/cis, and the cis/trans isomers, and mixtures of these compounds. Diisocyanates of this kind are available commercially.

Particularly important mixtures of these isocyanates are the mixtures of the respective structural isomers of diisocyanatotoluene and diisocyanatodiphenylmethane; the mixture of 80 mol % 2,4-diisocyanatotoluene and 20 mol % 2,6-diisocyanatotoluene is particularly suitable. Also of particular advantage are the mixtures of aromatic isocyanates such as 2,4-diisocyanatotoluene and/or 2,6-diisocyanatotoluene with aliphatic or cycloaliphatic isocyanates such as hexamethylene diisocyanate or IPDI, in which case the preferred mixing ratio of the aliphatic to the aromatic isocyanates is 1:9 to 9:1, more particularly 4:1 to 1:4.

The diols (b1) may be polyester polyols, which are known, for example, from Ullmanns Enzyklopädie der technischen Chemie, 4th edition, volume 19, pp. 62 to 65. It is preferred to use polyester polyols which are obtained by reacting dihydric alcohols with dibasic carboxylic acids. Instead of the free polycarboxylic acids it is also possible to use the corresponding polycarboxylic anhydrides or corresponding polycarboxylic esters of lower alcohols or mixtures thereof to prepare the polyester polyols. The polycarboxylic acids can be aliphatic, cycloaliphatic, araliphatic, aromatic or heterocyclic and can optionally be substituted, by halogen atoms for example, and/or unsaturated. Examples thereof include the following: suberic acid, azelaic acid, phthalic acid, isophthalic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid, and dimeric fatty acids. Preferred dicarboxylic acids are those of the general formula HOOC—(CH$_2$)$_y$—COOH, where y is a number from 1 to 20, preferably an even number from 2 to 20, examples being succinic acid, adipic acid, sebacic acid, and dodecanedicarboxylic acid. Examples of suitable dihydric alcohols include ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentanediols, and also diethylene glycol, triethylene glycol, tetraethylene glycol, polyethylene glycol, dipropylene glycol, polypropylene glycol, and dibutylene glycol and polybutylene glycols. Preferred alcohols are those of the general formula HO—(CH$_2$)$_x$—OH, where x is a number from 1 to 20, preferably an even number from 2 to 20. Examples of such alcohols are ethylene glycol, butane-1,4-diol, hexane-1,6-diol, octane-1,8-diol, and dodecane-1,12-diol. Preference is also given to neopentyl glycol.

The diols (b1) may also be polycarbonate diols, such as may be obtained, for example, by reacting phosgene with an excess of the low molecular weight alcohols specified as synthesis components for the polyester polyols.

The diols (b1) may also be lactone-based polyester diols, which are homopolymers or copolymers of lactones, preferably hydroxyl-terminated adducts of lactones with suitable difunctional starter molecules. Preferred lactones contemplated are those derived from compounds of the general formula HO—(CH$_2$)$_z$—COOH, where z is a number from 1 to 20 and where one H atom of a methylene unit may also be substituted by a C$_1$ to C$_4$ alkyl radical. Examples are ε-caprolactone, β-propiolactone, γ-butyrolactone and/or methyl-γ-caprolactone, and mixtures thereof. Examples of suitable starter components are the low molecular weight dihydric alcohols specified above as a synthesis component for the polyester polyols. The corresponding polymers of ε-caprolactone are particularly preferred. Lower polyester diols or polyether diols as well can be used as starters for preparing the lactone polymers. Instead of the polymers of lactones it is also possible to use the corresponding chemically equivalent polycondensates of the hydroxycarboxylic acids corresponding to the lactones.

The diols (b1) may also be polyether diols. Polyether diols are obtainable in particular by polymerizing ethylene oxide, propylene oxide, butylene oxide, tetrahydrofuran, styrene oxide or epichlorohydrin with itself, in the presence of BF$_3$ for example, or by subjecting these compounds, optionally in a mixture or in succession, to addition reaction with starter components containing reactive hydrogen atoms, such as alcohols or amines, examples being water, ethylene glycol, propane-1,2-diol, propane-1,3-diol, 2,2-bis(4-hydroxyphenyl)propane, and aniline. Particular preference is given to polyether diols with a molecular weight of 500 to 5000, and in particular 600 to 4500. A particularly preferred polyether diol is polytetrahydrofuran. Suitable polytetrahydrofurans can be prepared by cationic polymerization of tetrahydrofuran in the presence of acidic catalysts, such as sulfuric acid or fluorosulfuric acid, for example. Preparation processes of this kind are known to the skilled person. Other suitable compounds b1) are am-diaminopolyethers, which are preparable by aminating polyalkylene oxides with ammonia.

Compounds subsumed under b$_1$) include only those polyether diols composed to an extent of less than 20% by weight of ethylene oxide, based on their total weight. Polyether diols with at least 20% by weight of incorporated ethylene oxide units are hydrophilic polyether diols, which are counted as monomers c).

It is optionally possible, additionally, to use polyhydroxyolefins, preferably those having 2 terminal hydroxyl groups, e.g., α,ω-dihydroxypolybutadiene, α,ω-dihydroxypolymethacrylic esters or α,ω-dihydroxypolyacrylic esters, as monomers b$_1$). Such compounds are known for example from EP-A 622 378. Further suitable polyols are polyacetals, polysiloxanes, and alkyd resins.

Preferably at least 95 mol % of the diols $b_1$) are polyester diols and/or polytetrahydrofuran. With particular preference exclusively polyester diols and/or polytetrahydrofuran are used as diols 131).

The hardness and the elasticity modulus of the polyurethanes can be increased by using as diols (b) not only the diols ($b_1$) but also low molecular weight diols ($b_2$) having a molecular weight of from about 60 to 500, preferably from 62 to 200 g/mol.

Monomers ($b_2$) used are in particular the synthesis components of the short-chain alkane diols specified for preparing polyester polyols, preference being given to the unbranched diols having 2 to 12 C atoms and an even number of C atoms, and also to pentane-1,5-diol and neopentyl glycol. Examples of suitable diols $b_2$) include ethylene glycol, propane-1,2-diol, propane-1,3-diol, butane-1,3-diol, butene-1,4-diol, butyne-1,4-diol, pentane-1,5-diol, neopentyl glycol, bis(hydroxymethyl)cyclohexanes such as 1,4-bis(hydroxymethyl)cyclohexane, 2-methylpropane-1,3-diol, methylpentane diols, additionally diethylene glycol, triethylene glycol, tetraethylene glycol, polyethylene glycol, dipropylene glycol, polypropylene glycol, dibutylene glycol, and polybutylene glycols. Preference is given to alcohols of the general formula $HO—(CH_2)_n—OH$, where x is a number from 1 to 20, preferably an even number from 2 to 20. Examples thereof are ethylene glycol, butane-1,4-diol, hexane-1,6-diol, octane-1,8-diol, and dodecane-1,12-diol. Preference is further given to neopentyl glycol.

In order to make the polyurethanes dispersible in water they comprise as synthesis components non-(a), non-(b), and non-(d) monomers (c), which carry at least one isocyanate group or at least one group reactive toward isocyanate groups and, furthermore, at least one hydrophilic group or a group which can be converted into a hydrophilic group. In the text below, the term "hydrophilic groups or potentially hydrophilic groups" is abbreviated to "(potentially) hydrophilic groups". The (potentially) hydrophilic groups react with isocyanates at a substantially slower rate than do the functional groups of the monomers used to synthesize the polymer main chain. The fraction of the components having (potentially) hydrophilic groups among the total quantity of components (a) to (f) is generally such that the molar amount of the (potentially) hydrophilic groups, based on the amount by weight of all monomers (a) to (e), is from 30 to 1000, preferably 50 to 500, and more preferably 80 to 300 mmol/kg. The (potentially) hydrophilic groups can be nonionic or, preferably, (potentially) ionic hydrophilic groups.

Particularly suitable nonionic hydrophilic groups are polyethylene glycol ethers composed of preferably 5 to 100, more preferably 10 to 80 repeating ethylene oxide units. The amount of polyethylene oxide units is generally 0 to 10%, preferably 0 to 6% by weight, based on the amount by weight of all monomers (a) to (e). Preferred monomers containing nonionic hydrophilic groups are polyethylene oxide diols containing at least 20% by weight of ethylene oxide, polyethylene oxide monools, and the reaction products of a polyethylene glycol and a diisocyanate which carry a terminally etherified polyethylene glycol radical. Diisocyanates of this kind and processes for preparing them are specified in U.S. Pat. Nos. 3,905,929 and 3,920,598.

Ionic hydrophilic groups are, in particular, anionic groups such as the sulfonate, the carboxylate, and the phosphate groups in the form of their alkali metal salts or ammonium salts, and also cationic groups such as ammonium groups, especially protonated tertiary amino groups or quaternary ammonium groups. Potentially ionic hydrophilic groups are, in particular, those which can be converted into the above-mentioned ionic hydrophilic groups by simple neutralization, hydrolysis or quaternization reactions, in other words, for example, carboxylic acid groups or tertiary amino groups. (Potentially) ionic monomers (c) are described at length in, for example, Ullmanns Enzyklopädie der technischen Chemie, 4th edition, volume 19, pp. 311-313 and in, for example, DE-A 1 495 745.

Of particular practical importance as (potentially) cationic monomers (c) are, in particular, monomers containing tertiary amino groups, examples being tris(hydroxyalkyl)amines, N,N'-bis(hydroxyalkyl)alkylamines, N-hydroxyalkyldialkylamines, tris(aminoalkyl)amines, N,N'-bis(aminoalkyl)alkylamines, and N-aminoalkyldialkylamines, the alkyl radicals and alkanediyl units of these tertiary amines consisting independently of one another of 1 to 6 carbon atoms. Also suitable are polyethers containing tertiary nitrogen atoms and preferably two terminal hydroxyl groups, such as are obtainable in a conventional manner, for example, by alkoxylating amines containing two hydrogen atoms attached to amine nitrogen, such as methylamine, aniline or N,N'-dimethylhydrazine. Polyethers of this kind generally have a molar weight of between 500 and 6000 g/mol. These tertiary amines are converted into the ammonium salts either with acids, preferably strong mineral acids such as phosphoric acid, sulfuric acid, hydrohalic acids, or strong organic acids, or by reaction with suitable quaternizing agents such as $C_1$ to $C_6$ alkyl halides or benzyl halides, e.g., bromides or chlorides.

Suitable monomers having (potentially) anionic groups normally include aliphatic, cycloaliphatic, araliphatic or aromatic carboxylic acids and sulfonic acids which carry at least one alcoholic hydroxyl group or at least one primary or secondary amino group. Preference is given to dihydroxyalkylcarboxylic acids, especially those having 3 to 10 C atoms, such as are also described in U.S. Pat. No. 3,412,054. Particular preference is given to compounds of the general formula ($c_1$)

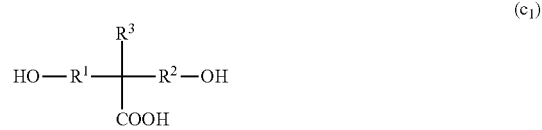

in which $R^1$ and $R^2$ are a $C_1$ to $C_4$ alkanediyl (unit) and $R^3$ is a $C_1$ to $C_4$ alkyl (unit), and especially to dimethylolpropionic acid (DMPA). Also suitable are corresponding dihydroxysulfonic acids and dihydroxyphosphonic acids such as 2,3-dihydroxypropanephosphonic acid. Otherwise suitable are dihydroxyl compounds having a molecular weight of more than 500 to 10 000 g/mol and at least 2 carboxylate groups, which are known from DE-A 39 11 827. They are obtainable by reacting dihydroxyl compounds with tetracarboxylic dianhydrides such as pyromellitic dianhydride or cyclopentanetetracarboxylic dianhydride in a molar ratio of 2:1 to 1.05:1 in a polyaddition reaction. Particularly suitable dihydroxyl compounds are the monomers (b2) cited as chain extenders and also the diols (b1).

Suitable monomers (c) containing amino groups reactive toward isocyanates include aminocarboxylic acids such as lysine, β-alanine or the adducts of aliphatic diprimary diamines with α,β-unsaturated carboxylic or sulfonic acids that are specified in DE-A 20 34 479. Such compounds obey, for example, the formula ($c_2$)

where $R^4$ and $R^5$ independently of one another are a $C_1$ to $C_6$ alkanediyl unit, preferably ethylene and X is COOH or $SO_3H$. Particularly preferred compounds of the formula ($c_2$) are N-(2-aminoethyl)-2-aminoethanecarboxylic acid and also N-(2-aminoethyl)-2-aminoethanesulfonic acid and the corresponding alkali metal salts, with Na being a particularly preferred counterion.

Also particularly preferred are the adducts of the abovementioned aliphatic diprimary diamines with 2-acrylamido-2-methylpropanesulfonic acid, as described for example in DE-B 1 954 090.

Where monomers with potentially ionic groups are used, their conversion into the ionic form may take place before, during or, preferably, after the isocyanate polyaddition, since the ionic monomers do not frequently dissolve well in the reaction mixture. Examples of neutralizing agents include ammonia, NaOH, triethanolamine (TEA), triisopropylamine (TIPA) or morpholine, or its derivatives. The sulfonate or carboxylate groups are more preferably in the form of their salts with an alkali metal ion or ammonium ion as counterion.

In accordance with the invention, the polyurethane contains one or more uretdione groups. The polyurethanes comprising uretdione groups are obtainable preferably by using at least one polyisocyanate uretdione (d) in their preparation. Polyisocyanate uretdiones are compounds which comprise at least one uretdione group and two or more isocyanate groups. Preference is given to diisocyanate uretdiones, more particularly the dimers of diisocyanates.

Diisocyanate dimers are, for example, those in which the uretdione group is attached to aromatic nuclei, examples being the dimers of diphenylmethane 4,4'-diisocyanate, diphenylmethane 2,4'-diisocyanate, 3,3'-dimethyl-4,4'-diphenylmethane diisocyanate, 4-methyl-diphenylmethane 3,4'-diisocyanate, 2,5-dimethyldiphenylmethane 4,4'-diisocyanate, diphenyl 4,4'-diisocyanate, 4-phenoxy-3-isocyanatophenyl isocyanate, 4-methoxy-3-isocyanatophenyl isocyanate, 4-ethoxy-3-isocyanaatophenyl isocyanate, 4-propoxy-3-isocyanaatophenyl isocyanate, 4-methyl-3-isocyanatophenyl isocyanate, 3-methyl-4-isocyanatophenyl isocyanate, 4-ethyl-3-isocyanatophenyl isocyanate, 4-(2-isocyanatoethyl)phenyl isocyanate, 1,2,3,4,5,6-hexahydrodiphenylmethane 4,4'-diisocyanate, 3-isocyanatophenyl isocyanate, 4-(2-isocyanato-2-methylethyl)phenyl isocyanate, alpha-(1-isocyanatocyclohexyl)-p-tolylisocyanate, 3,3',5,5'-tetramethyldiphenylmethane 4,4'-diisocyanate, and diphenyldimethylmethane 4,4'-diisocyanate.

Particularly preferred are the diisocyanate dimers selected from the group consisting of 2,4'-diphenylmethane diisocyanate (MDI), 1,6-hexamethylene diisocyanate (HDI), isophorone diisocyanate (IPDI), 2,4-tolylene diisocyanate (TDI), 1,4-tetramethylene diisocyanate, 4,4'-diisocyanatodicyclohexylmethane, and mixtures thereof. Particularly preferred are aliphatic diisocyanate dimers, more particularly HDI, IPDI, 1,4-tetramethylene diisocyanate, and 4,4'-diisocyanatodicyclohexylmethane.

The diisocyanate dimers may be prepared in a conventional way by dimerizing the parent diisocyanates.

The amount of uretdione groups in the polyurethane is preferably from 0.1% to 3% by weight, more preferably from 0.5 to 2.5% by weight.

The monomers (e), which are different from the monomers (a) to (d) and which may also be constituents of the polyurethane, serve generally for crosslinking or chain extension. They generally comprise nonphenolic alcohols with a functionality of more than 2, amines having 2 or more primary and/or secondary amino groups, and compounds which as well as one or more alcoholic hydroxyl groups carry one or more primary and/or secondary amino groups. Alcohols having a functionality of more than 2, which may be used in order to set a certain degree of branching or crosslinking, include for example trimethylolpropane, glycerol, or sugars.

Also suitable are monoalcohols which as well as the hydroxyl group carry a further isocyanate-reactive group, such as monoalcohols having one or more primary and/or secondary amino groups, monoethanolamine for example. Polyamines having 2 or more primary and/or secondary amino groups are used especially when the chain extension and/or crosslinking is to take place in the presence of water, since amines generally react more quickly than alcohols or water with isocyanates. This is frequently necessary when the desire is for aqueous dispersions of crosslinked polyurethanes or polyurethanes having a high molar weight. In such cases the approach taken is to prepare prepolymers with isocyanate groups, to disperse them rapidly in water, and then to subject them to chain extension or crosslinking by adding compounds having two or more isocyanate-reactive amino groups.

Amines suitable for this purpose are generally polyfunctional amines of the molar weight range from 32 to 500 g/mol, preferably from 60 to 300 g/mol, which comprise at least two amino groups selected from the group consisting of primary and secondary amino groups. Examples of such amines are diamines such as diaminoethane, diaminopropanes, diaminobutanes, diaminohexanes, piperazine, 2,5-dimethylpiperazine, amino-3-aminomethyl-3,5,5-trimethylcyclohexane (isophoronediamine, IPDA), 4,4'-diaminodicyclohexylmethane, 1,4-diaminocyclohexane, aminoethylethanolamine, hydrazine, hydrazine hydrate or triamines such as diethylenetriamine or 1,8-diamino-4-aminomethyloctane. The amines can also be used in blocked form, e.g., in the form of the corresponding ketimines (see for example CA-A 1 129 128), ketazines (cf., e.g., U.S. Pat. No. 4,269,748) or amine salts (see U.S. Pat. No. 4,292,226). Oxazolidines as well, as used for example in U.S. Pat. No. 4,192,937, represent blocked polyamines which can be used for the preparation of the polyurethanes of the invention, for chain extension of the prepolymers. Where blocked polyamines of this kind are used they are generally mixed with the prepolymers in the absence of water and this mixture is then mixed with the dispersion water or with a portion of the dispersion water, so that the corresponding polyamines are liberated by hydrolysis. It is preferred to use mixtures of diamines and triamines, more preferably mixtures of isophoronediamine (IPDA) and diethylenetriamine (DETA).

The polyurethanes comprise preferably 1 to 30 mol %, more preferably 4 to 25 mol %, based on the total amount of components (b) and (e), of a polyamine having at least 2 isocyanate-reactive amino groups as monomers (e).

For the same purpose it is also possible to use, as monomers (e), isocyanates having a functionality of more than two. Examples of standard commercial compounds are the isocyanurate or the biuret of hexamethylene diisocyanate.

Monomers (f), which are used optionally, are monoisocyanates, monoalcohols, and mono-primary and -secondary amines. Their fraction is generally not more than 10 mol %, based on the total molar amount of the monomers. These monofunctional compounds customarily carry further functional groups such as olefinic groups or carbonyl groups and serve to introduce into the polyurethane functional groups which facilitate the dispersing and/or the crosslinking or further polymer-analogous reaction of the polyurethane. Monomers suitable for this purpose include those such as isopropenyl-α,α'-dimethylbenzyl isocyanate (TMI) and esters of acrylic or methacrylic acid such as hydroxyethyl acrylate or hydroxyethyl methacrylate.

Coatings having a particularly good profile of properties are obtained in particular when monomers (a) used include essentially only aliphatic diisocyanates, cycloaliphatic diisocyanates or araliphatic diisocyanates. This monomer combination is supplemented outstandingly as component (c) by alkali metal salts of diaminosulfonic acids, especially by N-(2-aminoethyl)-2-aminoethanesulfonic acid and/or its corresponding alkali metal salts, the Na salt being the most suitable, and by a mixture of DETA and IPDA as component (e).

Within the field of polyurethane chemistry it is general knowledge how the molecular weight of polyurethanes can be adjusted by selecting the proportions of the mutually reactive monomers and also the arithmetic mean of the number of reactive functional groups per molecule. Components (a) to (f) and their respective molar amounts are normally chosen so that the ratio A:B, where A) is the molar amount of isocyanate groups and
B) is the sum of the molar amount of the hydroxyl groups and the molar amount of the functional groups which are able to react with isocyanates in an addition reaction, is 0.5:1 to 2:1, preferably 0.8:1 to 1.5:1, more preferably 0.9:1 to 1.2:1. With very particular preference the ratio A:B is as close as possible to 1:1.

The monomers (a) to (f) employed carry on average usually 1.5 to 2.5, preferably 1.9 to 2.1, more preferably 2.0 isocyanate groups and/or functional groups which are able to react with isocyanates in an addition reaction.

The polyaddition of components (a) to (f) for preparing the polyurethane takes place preferably at reaction temperatures of up to 180° C., more preferably up to 150° C., under atmospheric pressure or under autogenous pressure. The preparation of polyurethanes, and of aqueous polyurethane dispersions, is known to the skilled person.

An aqueous polyurethane dispersion for the purposes of the present invention is a dispersion which has an aqueous solvent as a continuous phase. Suitable aqueous solvents are water and mixtures of water with water-miscible solvents, examples being alcohols, such as methanol, ethanol, n-propanol, isopropanol, n-butanol, sec-butanol, tert-butanol, n-hexanol and cyclohexanol; glycols, such as ethylene glycol, propylene glycol, and butylene glycol; the methyl or ethyl ethers of the dihydric alcohols, diethylene glycol, triethylene glycol, polyethylene glycols having number-average molecular weights of up to about 3000, glycerol and dioxane and also ketones, such as acetone in particular. In one specific embodiment the polyurethane dispersion is substantially free from organic solvents. By "substantially free from organic solvents" here is meant that the fraction of organic solvents is not more than 5% by weight, more preferably not more than 1% by weight, more particularly not more than 0.1% by weight, based on the total weight of the solvent.

In one preferred embodiment, the polyurethanes are prepared in the presence of at least one organic solvent. Preferred organic solvents for preparing the polyurethanes are ketones, such as acetone and methyl ethyl ketone, and also N-methylpyrrolidone. Acetone is used with particular preference. Where an at least partly water-miscible solvent is used for preparing the polyurethanes, the polyurethane dispersion of the invention may comprise, in addition to water, the organic solvent used for the preparation. It will be appreciated that the polyurethane dispersions of the invention can be prepared in the presence of at least one organic solvent which is subsequently replaced in whole or in part by water.

The polymer dispersions of the invention comprise at least one solid polyamine with a deactivated surface. Polyamines are compounds having two or more amino groups, including hydrazines, hydrazides, and semicarbazides. Solid polyamines are, in accordance with the invention, those having a melting point of greater than or equal to 30° C., preferably greater than or equal to 60° C. The deactivated polyamine likewise has a melting point of preferably at least 30° C., at least 50° C. or greater than or equal to 60° C. or greater than or equal to 80°.

The solid polyamines are preferably in the form of particles with an average size of from 1 to 200 μm or from 2 to 50 μm or from 3 to 10 μm.

Starting materials for the deactivated solid polyamines are all polyamines or mixtures thereof which are present in the form of solids and which have two or more primary and/or secondary amine groups. They may be aliphatic, cycloaliphatic, araliphatic, aromatic or heterocyclic polyamines. Preferred solid polyamines are selected from the group consisting of solid aliphatic polyamines, solid aromatic polyamines, solid dihydrazides, solid semicarbazides, solid amine-epoxy addition compounds, solid amino-functional Michaels addition compounds, solid amino-containing polymers, and mixtures of two or more of these polyamines, the amino groups being primary or secondary amino groups and the solid polyamine having a melting point of at least 30° C. The polyamine preferably has a melting point of between 50 and 80° C. or between 55 and 70° C.

Examples of suitable solid aliphatic diamines are, for example, solid alpha,omega-alkyldiamines having at least 6 C atoms, preferably having 8 to 30 C atoms, for example, 1,8-octamethylenediamine, 1,10-decanediamine, or 1,12-dodecanediamines. Examples of suitable dihydrazides are adipic dihydrazide (ADDH), isophthalic dihydrazide (IDH) or sebacic dihydrazide (SDH). An example of a solid aromatic diamine is 4,4'-diaminodiphenylmethane.

Solid polyamines with a deactivated surface are, in accordance with the invention, those solid polyamines which are in particle form, in which some of the amino groups have been converted by reaction with compounds reactive toward amino groups. In the case of preferred polymer dispersions, 0.1 to 15 equivalent percent of the amino groups of the polyamine are deactivated.

Deactivation can be accomplished in various ways, as for example by reaction with isocyanates, by acylation with, for example, acid chlorides or polymeric anhydrides, or by alkylation with, for example, polyepoxides. Deactivation may also be accomplished by reaction of the polyamines with compounds containing acrylic groups, through a Michael addition, with catalysis by acids in the case of aromatic amines.

Deactivation with isocyanates can be accomplished, for example, by reaction with aliphatic, cycloaliphatic or aromatic monoisocyanates or polyisocyanates (i.e. compounds having two or more isocyanate groups) and the prepolymers thereof with diols or polyols. Reactions of this kind are described in detail in EP 171 015 for example. In that case, for deactivating the surface of solid, finely divided polyamines, substoichiometric amounts (e.g. at least 0.1 or at least 0.2 or at least 0.5 and not more than 25 or not more than 15 or not more than 10 equivalent-%, based on the amino groups of the polyamines) of water-insoluble, liquid or solid mono- or polyisocyanates are used. Suitable polyisocyanates are, for example, those which may be used as described above as a component (a) for preparing the polyurethanes of the invention. Preference is given to 1,6-hexamethylene diisocyanate and isophorone diisocyanate.

Examples of isocyanates preferred for the deactivation of the solid polyamines are polyisocyanates selected from the product ranges Basonat HI, Basonat IT, Basonat HA, Basonat HB, Basonat HW or Basonat LR.

In one embodiment the polymer dispersions in question are those comprising
the polyurethane in an amount from 20% to 60% by weight,
the solid polyamine in an amount from 1% to 20% by weight, and
the uretdione groups in an amount from 0.1% to 5% by weight.

The polyurethane dispersions of the invention can be used in the form of the aqueous dispersions. Alternatively they may be converted to powder form by various drying processes, such as spray drying, fluidized spray drying, roll drying or freeze drying, for example. The dry polymer powders thus obtained can advantageously be converted back, by redispersion in water, into an aqueous dispersion (secondary dispersion). Copolymers in powder form have the advantage of better storage qualities, greater facility of transportation, and, generally, a reduced susceptibility to microbial infestation. These dispersions are prepared by simple mixing with water. Usually, the shearing forces needed to achieve this are low. It is possible to use the mixing equipment known to the skilled person, such as simple stirring equipment.

The polyurethane dispersions of the invention are latently reactive in the sense that, with certain preconditions, a chemical reaction can be induced. By raising the temperature to, or above the melting temperature of the polyamine, it is possible to initiate or accelerate a reaction of the amino groups with the uretdione groups and thereby to bring about or accelerate crosslinking. Activation of the crosslinking reaction may also be accomplished by electromagnetic radiation, especially infrared radiation or microwave radiation, e.g., infrared radiation with a wavelength of 780 nm to 1 mm or microwave radiation with a wavelength of greater than 1 mm to 1 m.

Surprisingly, even the addition of relatively small amounts of deactivated polyamine produces a sharp increase in the mechanical strength of coatings or adhesive bonds, and this indicates significant and effective crosslinking.

The polymer dispersions of the invention preferably have a viscosity in a range from 10 to 2000 mPa s, more preferably from 100 to 900 mPa s. The viscosity may be determined in accordance with DIN EN ISO 3219 at a temperature of 23° C., using a rotational viscometer.

The use of deactivated polyamines results in crosslinking properties whose quality is good and comparable with that obtained when using free, nondeactivated amines. However, by virtue of the fact that crosslinking takes place only at elevated temperature or only on activation by electromagnetic radiation, one-component systems are enabled that have a longer storage life or processing life.

The invention also provides for the use of the above-described polymer dispersions of the invention as an adhesive, coating material or sealant, and for producing adhesives, coating materials or sealants. The polymer dispersions of the invention can be used as a primary dispersion for preparing formulations, such as coating materials, sealants, and adhesives. They may also, generally, be converted advantageously into a solid form, such as a powder, which can easily be redispersed to form a secondary dispersion and thus may be incorporated into a formulation, such as a coating material, sealant or adhesive.

The invention also provides adhesive, coating or sealing compositions comprising an above-described polymer dispersion of the invention and at least one further additive, selected from further binders, stabilizers, fillers, thickeners, wetting assistants, defoamers, crosslinkers, ageing inhibitors, fungicides, pigments, soluble dyes, matting agents, and neutralizing agents.

The further additives may be added in a simple way to the polyurethane dispersion of the invention. Suitable stabilizers are in principle those of the kind typically used with aqueous dispersions. Polymer dispersion compositions with a very good shelf life are obtained using stabilizers selected from the group encompassing wetting agents, cellulose, polyvinyl alcohol, polyvinylpyrrolidone, and mixtures thereof.

Suitable further binders which may be used in addition to the polyurethane comprising uretdione groups including, in particular, free-radically polymerized polymers, preferably in the form of their aqueous dispersions. Polymers of this kind consist preferably to an extent of at least 60% by weight of what are called principal monomers, selected from $C_1$ to $C_{20}$ alkyl (meth)acrylates, vinyl esters of carboxylic acids comprising up to 20 C atoms, vinyl aromatics having up to 20 C atoms, ethylenically unsaturated nitriles, vinyl halides, vinyl ethers of alcohols comprising 1 to 10 C atoms, aliphatic hydrocarbons having 2 to 8 C atoms and one or two double bonds, or mixtures of these monomers. Polymers deserving particular mention are those composed to an extent of more than 60% by weight of $C_1$-$C_{20}$ alkyl (meth)acrylates (polyacrylates), or those composed to an extent of more than 60% by weight of styrene and 1,3-butadiene (styrene/butadiene copolymers, more particularly carboxylated styrene/butadiene copolymers).

Carboxylated styrene/butadiene copolymers are formed from styrene, butadiene, and at least one ethylenically unsaturated, free-radically polymerizable monomer having at least one carboxyl group, such as acrylic acid, methacrylic acid, fumaric acid, itaconic acid, etc., preferably acrylic acid.

In one particular embodiment the adhesive, coating or sealing compositions comprise no other kinds of binders. In another embodiment the adhesive, coating or sealing compositions comprise 10 to 50 parts by weight, or 20 to 50 parts by weight, or 30 to 50 parts by weight, based on the sum of all the polymers, of further binders, preferably polyacrylates and/or styrene/butadiene copolymers.

Particularly advantageous compositions are those which are free from organic solvents, more particularly free from what are called VOCs (volatile organic compounds) and/or free from plasticizers. Both plasticizers and organic solvents are disadvantageous from an ecotoxicological and occupational-health standpoint. Plasticizers may migrate to the surface and result in the failure of an adhesive bond or result in the surface becoming sticky, leading to contamination of the bond lines. Solvents as well are undesirable, since on the one hand they may entail an additional hazard potential during heating and during the application of the adhesive, and on the other hand they may also migrate and may be emitted over a long time to the environment and to materials which are in contact with the adhesive, and may adversely influence them, and/or may lead to failure of the adhesive bond. The compositions of the invention are therefore preferably purely aqueous systems with water as the sole solvent or sole dispersion medium. The solids content, this being the amount of all of the constituents apart from water or other compounds which are liquid at 21° C. and 1 bar, is preferably between 20% and 80% by weight.

The invention also relates to a method for the coating, adhesive bonding or sealing of substrates, in which
a) an above-described polymer dispersion of the invention is provided,
b) the polymer dispersion is applied to a first substrate, and c) it is heated to a temperature above the melting point of the solid polyamine, or there is activation by electromagnetic radiation. This activation by electromagnetic radiation may result in the desired heating.

The invention also provides substrates coated with an inactivated adhesive composition of the invention.

In the case of a method for the adhesive bonding of two substrates, the first substrate coated with the polymer dispersion is contacted with a second substrate, with heating taking place to a temperature above the melting point of the solid polyamine or there being activation by electromagnetic radiation, before or after the two substrates are contacted with one another.

The substrates may be selected, for example, from polymer films, paper, metal foils, wood veneer, fiber nonwovens made of natural synthetic fibers, shaped solid articles, examples being shaped parts made of metal, painted metal, wood, woodbase materials, fiber materials or plastic. A particularly preferred first substrate are polymer films. Polymer films are, more particularly, flexible sheetlike plastics in a thickness of 0.05 millimeter to 5 millimeters, which can be rolled up. Consequently, in addition to "films" in the strict sense of thicknesses below 1 mm, the term also extends to sealing sheets, of the kind typically used for sealing tunnels, roofs or swimming pools, in a thickness typically of 1 to 3 mm, and even, in special cases, in a thickness of up to a maximum of 5 mm. Polymeric films of this kind are produced typically by coating, casting, calendering or extrusion and are typically available commercially in rolls or are produced on site. They may be of single-layer or multilayer construction. The plastic of the polymer films is preferably a thermoplastic, e.g., polyesters, such as polyethylene terephthalate (PET), thermoplastic polyolefins (TPO) such as polyethylene, polypropylene, polyvinyl chloride, especially plasticized PVC, polyacetates, ethylene/vinylacetate copolymers (EVA), ASA (acrylonitrile/styrene/acrylate), PU (polyurethane), PA (polyamide), poly(meth)acrylates, polycarbonates, or their plastics alloys, including, in particular foamed PVC films and foamed thermoplastic polyolefin films (TPO). Particularly preferred are PVC and thermoplastic polyolefins (TPO). The shaped parts may also be moldings composed of synthetic or natural fibers or chips bound together by a binder to form a molding; also suitable in particular are moldings made of plastic, e.g., ABS. The moldings may have any desired shape.

The substrates or moldings can be coated with the adhesive by customary application techniques, as for example by spraying, spreading, knife coating, die application, roll application or casting application methods. Spray application is preferred.

The amount of coating or of adhesive applied is preferably 0.5 to 100 g/m², more preferably 2 to 80 g/m², very preferably 10 to 70 g/m². Preferably either only one substrate to be adhesively bonded, such as only the film or only the molding, for example, is coated on one side. Also suitable, however, is the coating of both substrates to be adhesively bonded, or of film and molding. Following the coating operation, there is typically a drying operation, preferably at room temperature or at temperatures up to 80° C., in order to remove water or other solvents.

The molding or substrate coated with a composition of the invention may be stored prior to crosslinking and/or prior to activation. Flexible substrates may be wound up into rolls, for example. For crosslinking and/or activation, the coating is activated thermally or by electromagnetic radiation. For this purpose, the temperature in the coating is preferably at least 30° C. or at least 50° C., as for example from 30 to 200° C., or from 50 to 180° C. or from 60 to 80° C.

The polymer dispersions of the invention are notable for a comparatively low viscosity, higher applicability to substrates, comparatively long storage life and processing life (pot life), and a crosslinkability which can be activated thermally or by electromagnetic radiation.

EXAMPLES

All percentages are weight figures unless otherwise indicated. Any content specified refers to the content in aqueous solution or dispersion. The viscosity can be determined in accordance with DIN EN ISO 3219 at a temperature of 23° C. using a rotational viscometer.

Compounds Used:
DBTL Dibutyltin dilaurate
DETA Diethylenetriamine
DMPA Dimethylolpropionic acid
HDI Hexamethylene 1,6-diisocyanate
IPDI Isophorone diisocyanate
TBOT Tetrabutyl orthotitanate
TDI Tolylene diisocyanate
ADDH Adipic dihydrazide Example 1

Polyurethane Dispersion PUD1

A stirring flask with reflux condenser and thermometer was charged with 601 g (0.30 mol) of a polyetherol with an OH number of 56 made from polypropylene oxide, 48.3 g (0.36 mol) of DMPA, 0.19 g of DBTL, 41.6 g of an HDI uretdione with an NCO content of 22%, and 113 g of acetone, at 60° C. 93.4 g (0.536 mol) of TDI were added and the mixture was stirred at 83° C. for 330 minutes. It was then diluted with 600 g of acetone and cooled to 35° C. The NCO content of the solution was found to be 0.182%. Added to this solution were 11.5 g of a 50% strength aqueous solution of NaOH and also 23 g of water. After 5 minutes, dispersion was carried out using 1163 g of water. Distillation of the acetone gave an aqueous polyurethane dispersion having a solids content of 41%.

Example 2

Polyurethane Dispersion PUD2

A stirring flask with reflux condenser and thermometer was charged with 601 g (0.30 mol) of a polyetherol with an OH number of 56 made from polypropylene oxide, 48.3 g (0.36 mol) of DMPA, 0.19 g of DBTL, 11.5 g of a TDI uretdione with an NCO content of 24%, and 56 g of acetone, at 60° C. 109.2 g (0.627 mol) of TDI were added and the mixture was stirred at 92° C. for 360 minutes. It was then diluted with 600 g of acetone and cooled to 35° C. The NCO content of the solution was found to be 0.221%. Added to this solution were 11.5 g of a 50% strength aqueous solution of NaOH and also 23 g of water. After 5 minutes, dispersion was carried out using 1163 g of water. Distillation of the acetone gave an aqueous polyurethane dispersion having a solids content of 40%.

Example 3

Polyurethane Dispersion PUD3

A stirring flask with reflux condenser and thermometer was charged with 210 g (0.09 mol) of a polyesterol with an OH number of 48 made from adipic acid and butane 1,4-diol, 0.04 g of DBTL, and 60 g of acetone, at 60° C. A mixture of 8.7 g (0.05 mol) of TDI and 8.4 g (0.05 mol) of HDI was added and the mixture was stirred at 67° C. for 90 minutes. It was then diluted with 240 g of acetone and cooled to 35° C. The NCO content of the solution was found to be 0.307%. Added to this solution were 11.9 g of a 50% strength aqueous solution of the sodium salt of 2'-aminoethane-2-ethanesulfonic acid and also 30 g of water. After 10 minutes, the solution was admixed with 5.2 g of an HDI uretdione with an NCO content of 22% and stirred for 5 minutes. Subsequently, dispersion is carried out using 345 g of water. Distillation of the acetone gave an aqueous polyurethane dispersion having a solids content of 38%.

Example 4

Deactivated Amine A1

Oil Phase
0.5 g nonionic surfactant (Atlox® 4912) 0.04 g organic polymer comprising fumed silica (Tego® Foamex 830)
37 g cyclohexane
0.12 g sodium dioctylsulfosuccinate (Lutensit® A-BO)
Feed 1
0.37 g a 70% strength solution (in naphtha) of 3-isocyanatomethyl-3,5,5-trimethylcyclohexyl isocyanate (Basonat® IT 270 S)

The oil phase was charged to a stirring apparatus and, with stirring, 25.7 g of a 97% strength aqueous solution of micronized 1,12-diaminododecane (D [4,3]=38.52 μm) were added. Feed 1 was added and the mixture was stirred for 15 minutes. The suspension was then placed into a ball mill and homogenized for 15 minutes with 3 mm glass beads at 1600 rpm. The suspension obtained was dried (removing cyclohexane) and used further in powder form.

Example 5

Deactivated Amine A2

Water Phase
1.5 g sodium naphthalene sulfonate (Tamol® NN 4501)
0.13 g organic polymer comprising fumed silica (Tego® Foamex 830)
113 g demineralized water
0.38 g sodium dioctylsulfosuccinate (Lutensit® A-BO)
Feed 1
0.15 g 1,6-hexamethylene diisocyanate (Basonat® HI 100)

The water phase was charged to a stirring apparatus and, with stirring, 250 g of a 6% strength aqueous suspension of micronized 1,12-diaminododecane were added. Feed 1 was added and the mixture was stirred for 15 minutes. The suspension was then placed into a ball mill and homogenized for 15 minutes with 3 mm glass beads at 1600 rpm. The aqueous suspension obtained contained capsules having an average size of D [4,3]=40.03 μm.

Example 6

Deactivated Amine A3

Example 6 was carried out in the same way as for example 8, using 0.26 g of 1,6-hexamethylene diisocyanate (Basonat® HI 100) instead of IPDI and 25.5 g of adipic dihydrazide. The suspension obtained was dried (removing cyclohexane) and used further in powder form.

Example 7

Deactivated Amine A4

Example 7 was carried out in the same way as for example 9, using 0.37 g of a 70% strength solution (in naphtha) of 3-isocyanatomethyl-3,5,5-trimethylcyclohexyl isocyanate (Basonat® IT 270 S) instead of Basonat® HI 100.

Example 8

Deactivated Amine A5

Oil Phase
0.5 g nonionic surfactant (Atlox® 4912)
0.04 g organic polymer comprising fumed silica (Tego® Foamex 830)
37 g cyclohexane
0.12 g sodium dioctylsulfosuccinate (Lutensit® A-BO)
Feed 1
0.26 g Isophorone diisocyanate (IPDI)

The oil phase was charged to a stirring apparatus and, with stirring (at 600 rpm) 25 g of micronized adipic dihydrazide were added. Feed 1 was added and the mixture was stirred for 15 minutes. The suspension was then placed into a ball mill and homogenized for 15 minutes with 3 mm glass beads at 1600 rpm. The suspension obtained was dried (removing cyclohexane) and used further in powder form. Particles were obtained with an average size of D [4,3]=22.39 μm.

Example 9

Deactivated Amine A6

Water Phase
0.5 g sodium naphthalenesulfonate (Tamol® NN 4501)
0.04 g organic polymer comprising fumed silica (Tego® Foamex 830)
37 g demineralized water
0.12 g sodium dioctylsulfosuccinate (Lutensit® A-BO)
Feed 1
0.26 g 1,6-hexamethylene diisocyanate (Basonat® HI 100)

The water phase was charged to a stirring apparatus and, with stirring, 25.7 g of a 97% strength aqueous solution of micronized 1,12-diaminododecane (D [4,3]=38.52 μm) were added. Feed 1 was added and the mixture was stirred for 15 minutes. The suspension was then placed into a ball mill and homogenized for 15 minutes with 3 mm glass beads at 1600 rpm.

Examples 10-16

Polyurethane Dispersions B10-16

From the polyurethane dispersion PUD1, by addition of amines, the polyurethane dispersions B11 to B16 as per table 1 were prepared.

TABLE 1

Amine-containing polyurethane dispersions B10-16

| | Polyurethane dispersion | Amine |
|---|---|---|
| B10 | 100 Parts by weight PUD1 | — |
| B11 | 95 Parts by weight PUD1 | 5 parts by weight of adipic dihydrazide (12% in water, not deactivated) |

TABLE 1-continued

Amine-containing polyurethane dispersions B10-16

| | Polyurethane dispersion | Amine |
|---|---|---|
| B12 | 95 Parts by weight PUD1 | 5 parts by weight 1,12-diaminododecane (10% in acetone, not deactivated) |
| B13 | 95 Parts by weight PUD1 | 5 parts by weight of deactivated amine A1 |
| B14 | 95 Parts by weight PUD1 | 5 parts by weight of deactivated amine A2 |
| B15 | 95 Parts by weight PUD1 | 5 parts by weight of deactivated amine A3 |
| B16 | 95 Parts by weight PUD1 | 5 parts by weight of deactivated amine A4 |

Performance Tests

The effect of crosslinking on the coating properties and adhesive properties were assessed by carrying out SAFTs (Shear Adhesion Failure Tests). In these tests, two beech panels were joined to one another by wet bonding to give a contact area of 25×25 mm. The adhesively bonded assembly is dried at 25° C. for three days and then fixed in an oven in such a way as to allow one beech panel to be loaded with a weight of 1 kg. The assembly is heated in the oven, beginning at 30° C., with a heating rate of 0.33° C. per minute. The temperature at which the adhesively bonded assembly comes apart is the SAFT temperature.

The results are summarized in table 2.

TABLE 2

Results of the SAFT tests

| Example | Amine type | SAFT temperature in ° C. |
|---|---|---|
| B10 | no amine | 66 |
| B11 | adipic dihydrazide, not deactivated | 118 |
| B12 | 1,12-diaminododecane, not deactivated | 110 |
| B13 | 1,12-diaminododecane, deactivated | 123 |
| B14 | 1,12-diaminododecane, deactivated | 112 |
| B15 | adipic dihydrazide, deactivated | 128 |
| B16 | solid amine, deactivated | 128 |

Inventive examples B13 to B16 show that the solid amines used lead to an increase in the SAFT temperatures, in spite of deactivation, in comparison to non-deactivated solid amines, and this indicates crosslinking that is of a similar quality or even somewhat better.

The invention claimed is:

1. An aqueous polymer dispersion, comprising:
   (1) a polyurethane in dispersion in aqueous phase and having uretdione groups, and
   (2) a solid polyamine with a deactivated surface;
   wherein the solid polyamine has at least two groups selected from primary and secondary amino groups, and a M.P. of at least 50° C., and
   wherein 0.1 to 15 equivalent percent of the amino groups of the solid polyamine are deactivated.

2. The polymer dispersion according to claim 1, wherein 0.1 to 15 equivalent percent of the amine groups of the solid polyamine are deactivated by reaction with isocyanates.

3. The polymer dispersion according to claim 1, wherein a surface of the solid polyamine is deactivated by reaction with isocyanates, by acylation or by alkylation.

4. The polymer dispersion according to claim 1, wherein the solid polyamine is at least one selected from the group consisting of solid aliphatic polyamine, solid aromatic polyamine, solid dihydrazide, solid semicarbazide, solid amine-epoxy addition compound, solid amino-functional Michael addition compound, and solid amino-comprising polymer.

5. The polymer dispersion according to claim 1, wherein the uretdione groups are derived from at least one diisocyanate dimer selected from the group consisting of 2,4'-diphenylmethane diisocyanate, 1,6-hexamethylene diisocyanate, isophorone diisocyanate, 2,4-tolylene diisocyanate, 1,4-tetramethylene diisocyanate, and 4,4'-diisocyanatodicyclohexylmethane.

6. The polymer dispersion according to claim 1, wherein the polyurethane is formed from a polyisocyanate, a polyisocyanate uretdione, and at least one polymeric polyol selected from the group consisting of polyesterdiol and polyetherdiol.

7. The polymer dispersion according to claim 1, comprising
   the polyurethane in an amount from 20% to 60% by weight,
   the solid polyamine in an amount from 1% to 20% by weight, and
   the uretdione groups in an amount from 0.1 to 5% by weight.

8. The polymer dispersion according to claim 1, wherein the polyurethane, based on a total weight of the monomers used, is synthesized to an extent of at least 60% by weight from diisocyanates, polyetherdiols, polyesterdiols, or any combination thereof.

9. The polymer dispersion according to claim 1, wherein the polyurethane is synthesized from
   a) a monomeric diisocyanate,
   b) a diol having a number-average molecular weight of from 500 to 5000 g/mol,
   c) a monomer, different from the monomeric diisocyanate (a) and the diol (b), having an isocyanate group or a group reactive toward isocyanate groups, and additionally carrying a hydrophilic group or potentially hydrophilic group,
   d) a polyisocyanate uretdione,
   e) optionally a further compound, different from the monomeric diisocyanate (a), the diol (b), the monomer (c), and the polyisocyanate uretdione (d), having at least two reactive groups selected from alcoholic hydroxyl groups, primary or secondary amino groups or isocyanate groups, and
   f) optionally a monofunctional compound, different from the monomeric diisocyanate (a), the diol (b), the monomer (c), the polyisocyanate uretdione (d), and the optionally further compound (e), having a reactive group which is an alcoholic hydroxyl group, a primary or secondary amino group or an isocyanate group.

10. The polymer dispersion according to claim 9, wherein the diol b) is selected from the group consisting of polytetrahydrofuran, polypropylene oxide, and a polyesterdiol selected from reaction products of dihydric alcohols with dibasic carboxylated acids, and lactone-based polyesterdiols.

11. The polymer dispersion according to claim 1, wherein 0.1 to 15 equivalent percent of the amine groups of the solid polyamine are deactivated by acylation.

12. The polymer dispersion according to claim 1, wherein 0.1 to 15 equivalent percent of the amine groups of the solid polyamine are deactivated by alkylation.

13. The polymer dispersion according to claim 1, wherein the solid polyamine has a M.P. of at least 60° C.

14. The polymer dispersion according to claim 1, wherein the solid polyamine has a M.P. between 50 and 80° C.

15. The polymer dispersion according to claim 1, wherein the solid polyamine has a M.P. between 55 and 75° C.

16. The polymer dispersion according to claim 1, wherein the solid polyamine is at least one selected from the group consisting of solid aliphatic diamines having 8 to 30 C atoms.

17. The polymer dispersion according to claim 1, wherein the solid polyamine is at least one selected from the group consisting of solid aromatic diamines.

18. The polymer dispersion according to claim 1, wherein the solid polyamine is at least one selected from the group consisting of solid dihydrazides.

19. The polymer dispersion according to claim 1, wherein the solid polyamine is in the form of particles having a particle size of from 1 to 200 μm.

20. The polymer dispersion according to claim 1, wherein the solid polyamine is at least one selected from the group consisting of solid 1,8-octamethylenediamine; 1,10-decanediamine; 1,12-dodecanediamine; adipic dihydrazide; isophthalic dihydrazide, sebacic dihydrazide, and 4,4'-diaminodiphenylmethane.

\* \* \* \* \*